Figure 1:
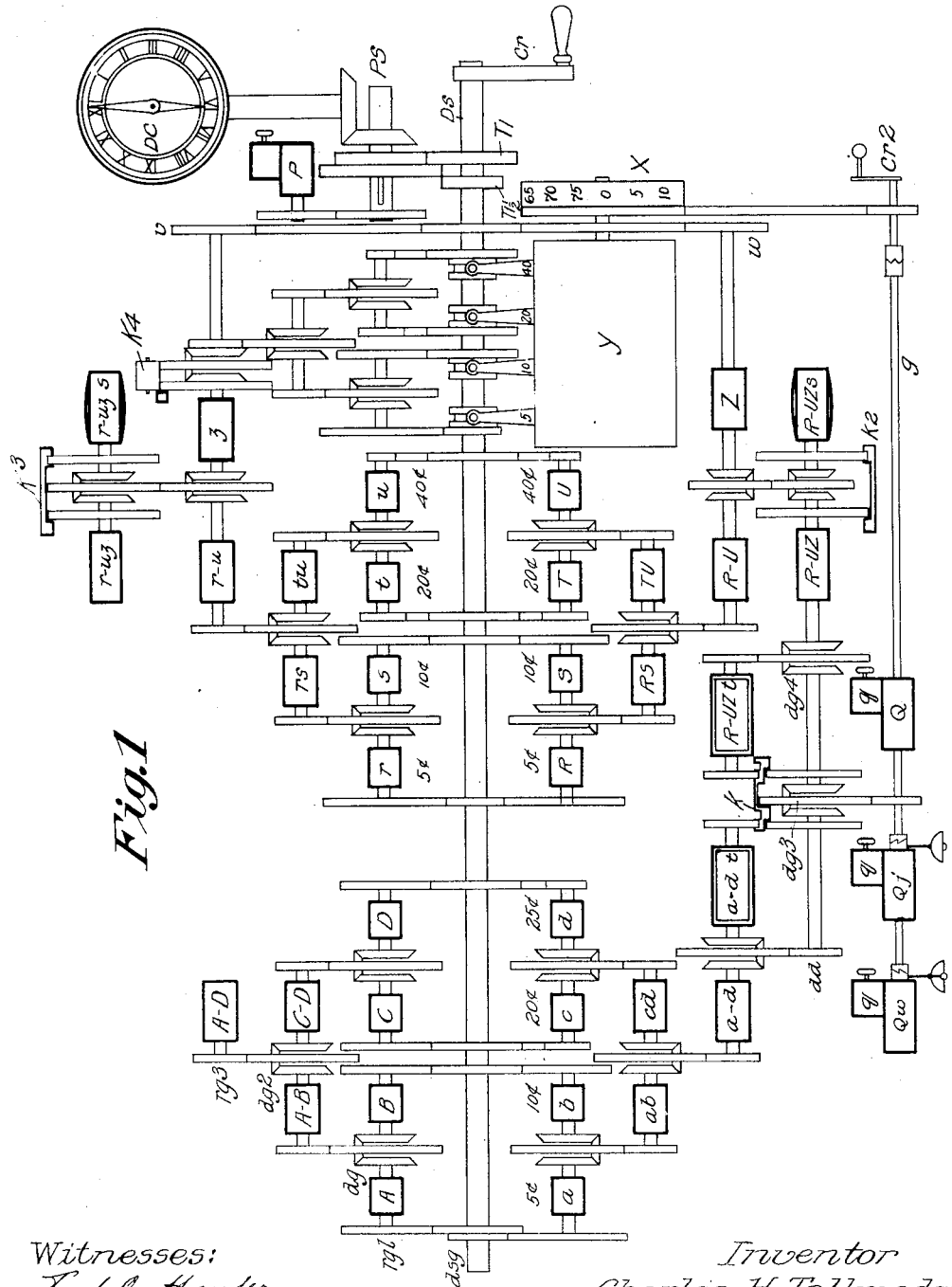

C. H. TALLMADGE.
MEANS AND METHOD FOR ACCOUNTING.
APPLICATION FILED MAR. 26, 1908. RENEWED JUNE 18, 1913.

1,084,671.

Patented Jan. 20, 1914.

4 SHEETS—SHEET 1.

Witnesses:
Fred O. Hunter
Leonard W. Novander

Inventor
Charles H. Tallmadge
By Brown & Williams
Attorneys

C. H. TALLMADGE.
MEANS AND METHOD FOR ACCOUNTING.
APPLICATION FILED MAR. 26, 1908. RENEWED JUNE 18, 1913.

1,084,671.

Patented Jan. 20, 1914.

4 SHEETS—SHEET 2.

Witnesses:
Fred O. Hender
Leonard W. Novander

Inventor
Charles H. Tallmadge
By Brown & Williams
Attorneys

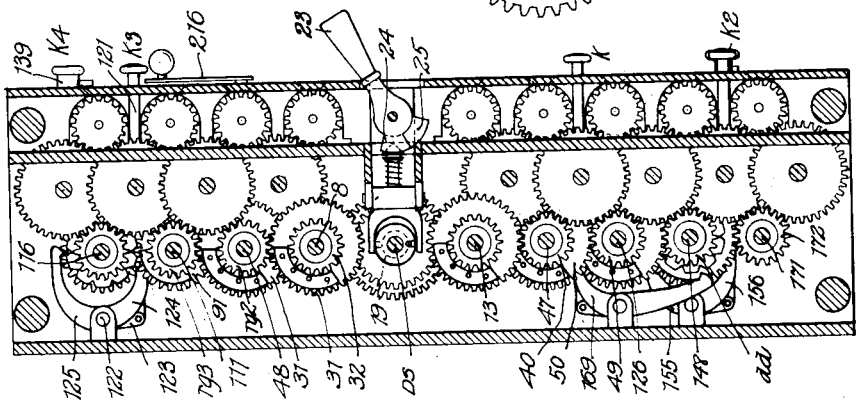

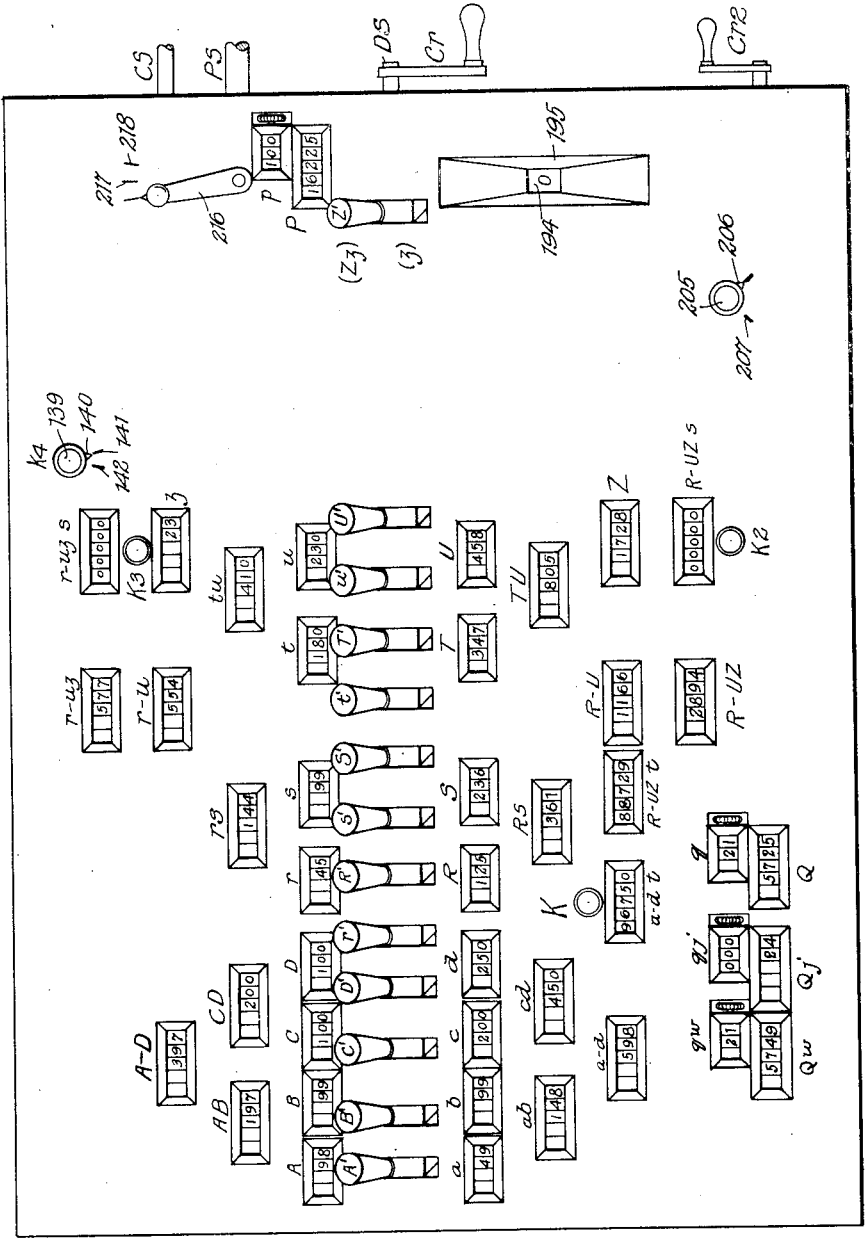

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

MEANS AND METHOD FOR ACCOUNTING.

1,084,671.   Specification of Letters Patent.   Patented Jan. 20, 1914.

Application filed March 26, 1908, Serial No. 423,284. Renewed June 18, 1913. Serial No. 774,481.

*To all whom it may concern:*

Be it known that I, CHARLES H. TALLMADGE, a citizen of the United States, residing at Chicago, in the county of Cook and State of Illinois, have invented a certain new and useful Improvement in Means and Methods for Accounting, of which the following is a full, clear, concise, and exact description, reference being had to the accompanying drawings, forming a part of this specification.

My invention relates to means and methods for accounting, and, while applicable to various purposes, the embodiment which I shall explain in detail is primarily intended for the concurrent accounting of time, wages and the labor element of job-cost in industrial production. A prompt knowledge of the condition of each time-account and its derived accounts is of special advantage in cost-accounting, because of the predominating weight of labor in most production, its greatly-varying efficiency and the peculiar opportunities for waste. There are, likewise, peculiar difficulties seemingly inherent in the prior art of recording and accounting the original and derived data. Without enlarging upon these difficulties it may be proper to state at the outset that my invention is not for the recording of the data, namely, the "in" and "out" of each workman, or the beginning and ending of each one of a large number of distinct fractional operations on a job. These data have been valuable heretofore mainly because they were necessary for the computation of specific elapsed times. Specific elapsed times, in turn, were valuable mainly because they were necessary for the computation of the total time of each workman or the total time spent on a given job. These total times were valuable mainly for the computation of wages and costs, which were the principal ultimate ends of all these recordings and accountings. As heretofore practised, these two accountings of wages and costs have not usually been harmonized without great labor or the forcing of balances.

Ignoring the minor advantages of securing a permanent record of the original data, the general purpose of my invention may be stated broadly to be the securing mechanically of the ultimate results directly and currently from the original ringing-in-and-out operations, thereby eliminating the greater part of the drudgery hitherto deemed inseparable from this important class of accounting, securing more accurate results because mechanical, and giving what is especially valuable in the distribution of labor, a current knowledge of the condition of each account, generic as well as specific. While not securing an absolutely mechanical balance between total wages and the total of the sums charged to specific jobs, I do secure an approximation to such a balance, and, further, a current mechanical indication of the exact difference between such totals.

In carrying out the principles of my invention I employ the well known mechanical one-way or lapsation-noting method of time-accounting, which is peculiarly adapted to this class of work, since this may be made to yield mechanically the desired current information, which is not the case with the method depending upon mental calculation of the difference between the "in" time and the "out" time and necessitating the postponement of such calculation until the "out" time is registered.

The machine in the prior art most nearly approaching the present invention is the well-known calculagraph, by means of which a card may be stamped at the beginning of a period and again at the close of the period, resulting in the showing of the elapsed time between the two stampings. That machine, however, does not mechanically associate a showing of elapsed time with any particular workman or rate of wages, nor with any particular job. Neither does the machine afford any intelligible showing applicable to either workman or job without bringing the period to a close. In other words, it records once for all a period wholly elapsed, without any reference to other periods; while my machine indicates currently an elapsing period, a mechanically-associated accruing wage at a given rate, a manually-associated accruing charge against a specific job (changing the job as frequently as desired), with a mechanically-secured indication of the difference, if any, between the total credit for wages and the total charge against the job or jobs. For example, assuming that workmen A, B, C and D are employed and that two or more jobs are in progress, means are provided for indicating the time during which each workman is employed, the amount of wages for each workman which he earns at his particular rate during the time interval he is at work, mechanism for charging the wages of any desired workman against a particular job for all of his working time or a part of it whether at his normal rate of wages or an arbitrary rate to be assigned him in connection with the job, and at the same time mechanism providing an indication of the difference if any between the total amount of wages and the amount charged to the job or jobs in process. The last condition may result if a part of a workman's time is occupied in connection with general work in the factory of such a nature that it can not be charged to any of the regular jobs in process, as a result of which such time, although necessarily paid for by the employer, would not appear in the total of the job charges. Furthermore, my machine secures mechanically the total of any number of lapsations or accruals in a given amount, whether successive or concurrent, as well as the grand total of such lapsations or accruals in a plurality of accounts. All that is required is the "ringing-in-or-out" in the proper individual accounts, substantially as is now done on employees' time registers or recorders. It will thus be seen that my invention is not for the recording of the original data but for the current mechanical accounting of such data, which is of special value to the manufacturer, since by means of it he may know the cost of the work as it progresses, hour by hour, which knowledge is a valuable factor in keeping foremen and workmen up to a high state of efficiency.

Figure 2:
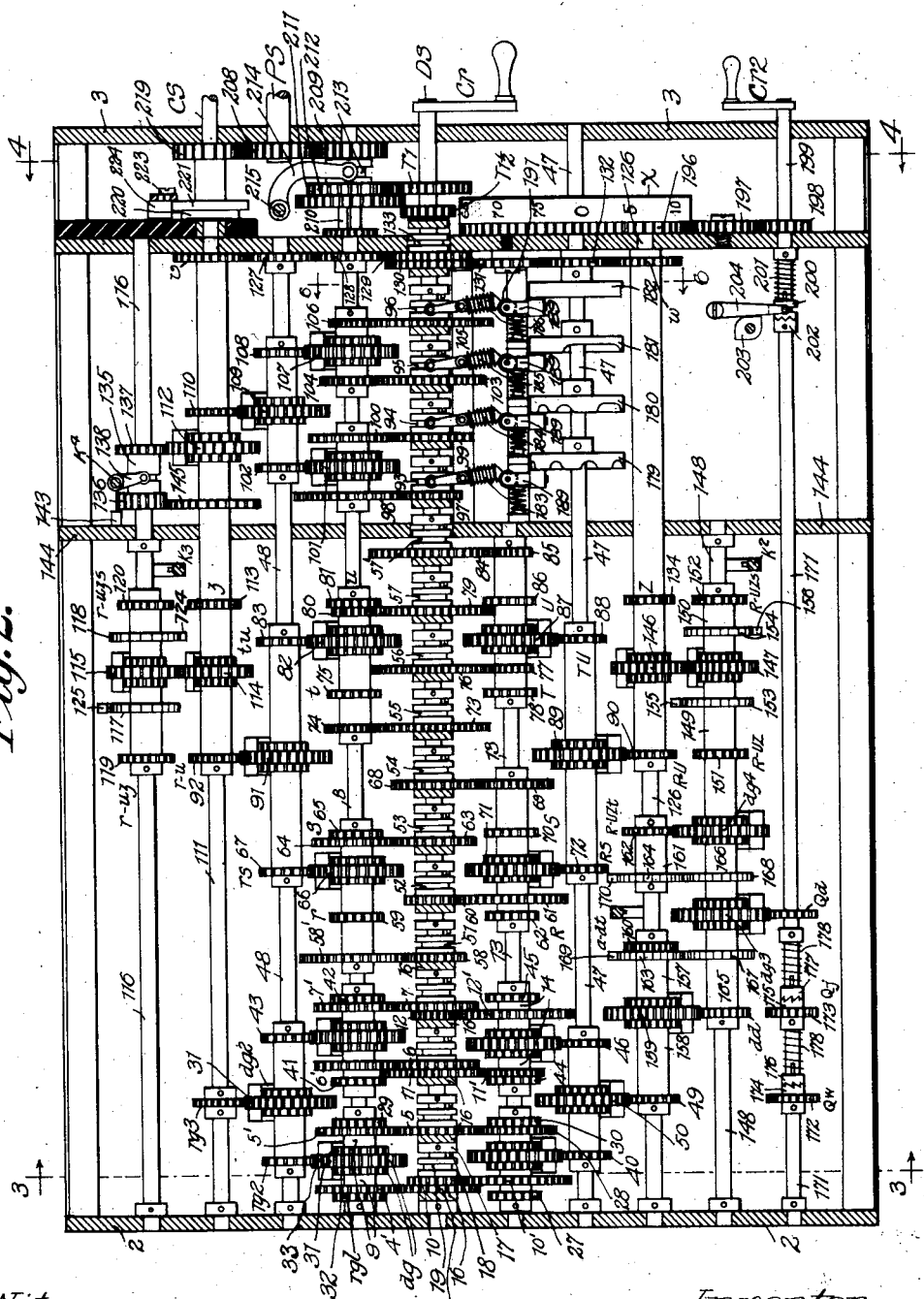

Other specific purposes will be disclosed in the description of the accompanying drawings, in which:

Figure 1 is a diagrammatic accounting layout, in which the mechanical features are minimized in order to bring out more clearly the purely accounting functions of the machine. Fig. 2 is a top plan view of the interior of the mechanism, certain of the parts being removed for the sake of clearness; Fig. 3 is a cross-sectional end view taken on line 3—3 of Fig. 2, looking in the direction indicated by the arrows; Fig. 4 is a cross-sectional end view taken on line 4—4 of Fig. 2, looking in the direction indicated by the arrows; Fig. 5 shows a development of the series of cam disks hereinafter referred to in detail; Fig. 6 is a detail view, partly in section, taken on line 6—6 of Fig. 2, showing the operative connection between a cam disk and the corresponding clutch; Fig. 7 is a detail view showing a finished form of clutch herein used for controlling the connection between the time controlled shaft and the various registers; Figs. 8 and 8' are detail views of a suitable form of differential gearing herein employed, and Fig. 9 is a front view of the mechanism as inclosed in its casings, showing the indications of the various registers as found at the end of a certain period.

In Fig. 1 the heavy rectangles represent cyclometers or registers, each assigned to a particular summation of time, wages, or costs. This figure may be considered as functionally divided into four sections, assigned respectively to time, wages, jobs and what I prefer to call the daily synthelysis of jobs, which phrase will be explained later. The time section contains seven registers: four primary or individual registers, A, B, C and D, designed to summate the times of four workmen separately, and assigned respectively to workmen having, say, corresponding initials: two department registers, AB and CD, the first to account the time of A and B, representing one department, and the second to account the time of C and D, representing a second department: and, finally, a factory or grand total register, A—D, designed to account the time of all workmen in all departments.

Before passing to other sections I will describe briefly the manner in which the registers are connected and actuated. DS is the main driving shaft, receiving its actuation from a clock-controlled driving mechanism DC through appropriate gears, T1 or T1½, and their connections. The clock or time controlled motor D. C. drives at uniform rate a shaft indicated as extending from it, and by means of a pair of bevel gears drives a shaft P. S., the latter shaft being connected by a pair of spur gears with the shaft D. S. as indicated, one of such gears being designated T1. The gear on the shaft P. S. which meshes with the gear T1 is rigidly secured to a second gear carried by the shaft P. S., both of such gears being movable longitudinally on the shaft so that the gear T1 may be engaged or disengaged as desired and when disengaged from its driving gear, the second gear carried by the shaft P. S. is brought into driving engagement with the gear T1½. These gear connections are adjustable into three positions. The one shown in the figure is the position for transmission at the normal rate, corresponding to "straight time". When shifted to the right, into the middle position, T1 is disengaged and T1½ is engaged, thereby transmitting at a 3 to 2 ratio, corresponding to "time and a half." When shifted farther to the extreme right, both T1 and T1½ are disengaged and the shaft may then, by means of the crank Cr, be actuated manually in a reverse direction to clear the registers.

Attached to the driving shaft is a gear dog, adapted to be clutched in for action when the workman "rings in," and to be thrown out of action when he "rings out." The clutching mechanism is entirely omitted from Fig. 1, being shown in detail in Fig. 2. When clutched in, the gear $dsg$ actuates the register gear $rg1$, which operates the register A and also actuates the set of differential gears $dg$, which set in turn drives the gear $rg2$, which operates the register AB and actuates the set of differential gears $dg2$, which latter drives the gears $rg3$ to operate the register A—D. The ratios of these gears are such that one revolution of the driving shaft counts up one "unit" in each of the registers A, AB and A—D. This one unit, in this application, corresponds to a period of six minutes, or one-tenth of an hour, and thus each of the time registers counts up in tenths of an hour.

Each of the registers B, C and D is connected and actuated similarly to A, the ratios being the same in each, and when all four are simultaneously operated AB and CD each receive an actuation of two units and A—D an actuation of four units for each revolution of the driving shaft, that is, for each six-minute period. Thus, ten revolutions of the driving shaft will register one hour in each of the individual registers, two hours in each of the department registers and four hours in the grand total register. The mechanical action of the differential gears will be described at length in connection with Fig. 2.

The general operation of that portion of the wage section which consists of the registers $a$, $b$, $c$, $d$, $ab$, $cd$, and $a$—$d$ is identical with the operation of the time section, with this exception: The primary registers $a$, $b$, $c$, and $d$ are geared to the driving shaft in different ratios, namely, (as represented more accurately in Fig. 2) register $a$ in the ratio of 10 to 5; $b$ in the ratio of 10 to 10; $c$ in the ratio of 10 to 20, and $d$ in the ratio of 10 to 25. This variety of ratios corresponds with the assumption, in this application, that workman A receives 5 cents per hour, workman B 10 cents, workman C 20 cents, and workman D 25 cents. The same clutch which connects in register A to account the time of workman A also connects in register $a$ to account his wages at the rate of one-half cent for each six-minute revolution of the driving shaft, resulting in the registration of 5 cents for each hour that workman A is "rung in." Similarly for $b$, at the rate of one cent for each revolution, or 10 cents per hour, and for $c$ at 20 cents and $d$ at 25 cents per hour. Register $ab$ accounts the totals of $a$ and $b$, namely, at the rate of 5 cents per hour when only $a$ is operating, 10 cents per hour when only $b$ is operating, and 15 cents per hour when both $a$ and $b$ are operating. Similarly, $cd$ accounts the totals of $c$ and $d$, and $a$—$d$ accounts the totals of $a$, $b$, $c$ and $d$, that is to say, $a$—$d$ accounts the total wages of the four workmen A, B, C and D, and it will be seen that such wage-accounting is in necessary harmony with the time-accounting performed in the corresponding time registers at the assumed rates per hour.

The section devoted to the accounting of jobs, including registers R, S, T, U, RS, TU and R—U, is practically the mechanical counterpart of the wage-section just described, with the exception that register U is connected with the driving shaft to count up at the rate of 40 cents per hour, instead of 25 cents. Each of the four primary registers R, S, T and U might be considered as assigned to a separate job, in which case RS would account the two jobs R and S, TU would account the two jobs T and U, and R—U would account the four jobs R, S, T and U; or, R and S may be considered as assigned to two separate operations of the job RS, and T and U as assigned to two operations of a second job TU, in which case R—U would account two jobs only. Obviously a large number of registers may be assigned to one job and two or more of the primary registers may be connected with the driving shaft to count up at the same rate per hour. Owing to the limited space available, I prefer to consider the seven registers as belonging to one job.

When workman A rings in, thereby throwing into action time register A and wage register $a$, the primary register R (geared to count up at the same rate per hour as $a$, namely, 5 cents) may also be connected with the driving shaft, and if it is so connected the amount earned by workman A and counted up in registers $a$, $ab$, and $a$—$d$ will also be counted up in job registers R, RS and R—U. If, later, workman B rings in, and simultaneously register S is connected with the driving shaft (the ratios of $b$ and S being the same, namely, 10 cents per hour), the wages of B will also be counted up in job registers S, RS and R—U. So, likewise, if workman C rings in, at 20 cents per hour, either while workmen A and B are employed or subsequently, and if, simultaneously with such ringing in of workman C, job register T (also at 20 cents per hour) is connected with the driving shaft, the wages of workman C will be counted up in registers T, TU and R—U. As shown in the drawing, no one register in the job section is suitable for connection when workman D rings in, at 25 cents per hour; but, assuming that R, S and T are not in operation, the wages of workman D may be handled in the job section by connecting in simultaneously R (at 5 cents) and T (at 20 cents). If, while the wages of workman D (25 cents) are being accounted against the job in registers R and T, workman A also begins work on the same job, thereby adding a 5-cent rate to the 25-cent rate already chargeable to the job, register R (5 cents) may be disconnected and S (10 cents) may be connected, thereby securing the accounting of the 30-cent rate in the job registers; and if, while A (5 cents) and D (25 cents) are thus working on the job, workman B (10 cents) begins work on this same job, the wages of all three men may be accounted against the job by disconnecting S (10 cents) and T (20 cents) and throwing into action register U, operating at a 40-cent rate.

In the drawing is shown a second job, Z, operated by what is in effect a duplicate of the connections, gears, etc., shown for job R—U, with these exceptions: No primary or intermediate registers are indicated, but the four clutches are shown for connecting in the four sets of primary gears, which in this case appear only in the upper half of the figure, leading to the register $z$ on the left, and by a series of gears $v$, $w$, on the right, down to the register Z in the job section. The gears clutched in for job Z operate at the following ratios: 5 cents, 10 cents, 20 cents, and 40 cents, and by a proper combination of them all other 5-cent rates up to 75 cents may be secured. Instead of being operated manually as in the case of the clutches heretofore mentioned, these Z clutches are operated through a nest of cams $y$, and a drum or dial $x$, by means of the crank $Cr2$. By turning the crank the drum is made to revolve and indicate the particular rate of the 5–75 series which is clutched in through the nest of cams, thus facilitating the selection and operation of the combination of clutches necessary to register at the desired rate.

The two jobs R—U and Z are summated in the register R—UZ which receives the sum of all the charges to the two jobs and should normally agree for any given period with the register $a$—$d$, which receives the sum of the wages of all the workmen for the same period. From the register $a$—$d$ two courses of transmission are possible; one to the "pocket" register $a$—$d$ $t$ and the other through the gear $dd$, the set of differential gears $dg3$ and the gear $Qd$ to register Q. Normally, the latter course is the only one open, the pocket register being adapted to be locked against actuation while the register $a$—$d$ is accumulating. So, also, on the job side, two courses of transmission are possible from R—UZ, namely, one to the pocket register R—UZ $t$ and the other to the register Q through the two sets of differentials $dg4$ and $dg3$. Without going into the mechanical construction, which will be explained in detail in connection with Fig. 2, it will suffice here to say that the actuation of Q through $a$—$d$ will be counteracted and normally counterbalanced by the actuation of Q through R—UZ, so that if the same or equivalent rates are operating in the wage section and in the job section for the same time there will be no actuation whatever in Q, the normal function of which is thus to indicate an equilibrium between the wage and the job sections. If, however, the wage registers are connected, with an insufficient counteracting connection made in the job section, the actuation received by the set of differential gears $dg3$ through $a$—$d$ will be greater than the counteracting actuation received by the same set of gears through R—UZ, with the result that the difference between these actuations will be indicated in Q. Similarly, if job registers are operated, with an insufficient counteracting operation of wage registers, the actuation of the set of differential gears $dg3$ through R—UZ will be greater than the actuation received through $a$—$d$ and the result will be the net actuation of Q in the contrary direction. To sum up, if the registers in the wage section are not exactly counterbalanced in their operation by the registers in the job section, the difference will be indicated in cents in the "equilibrium register" Q.

$Qw$ and $Qj$ are two associated equilibrium registers, $Qw$ acting only when the operation of the wage registers exceeds the operation of the job registers, and $Qj$ acting only when the operation of the job registers exceeds the operation of the wage registers. Thus while Q may show a small net amount of discrepancy between the wage and the job sections, $Qw$ and $Qj$ will show the gross amounts of such discrepancies. Attached to $Qw$ and $Qj$ are two bells of different tones, whose office is to indicate audibly the activity of their respective registers. All of the registers shown in the drawing may be of the well known Veeder type, the three equilibrium registers being of the style known as double or "trip" cyclometers. The "trip" registration is shown in each case at $q$, and may be utilized for indicating the amount of discrepancy for a day or other given short period, while the main register indicates the amount for a longer period.

The equilibrium register is connected with the drum $x$ by the shaft $q$ and the indicated gears, the office of which connection is to adjust the drum so as to correct mechanically any lack of equilibrium between the wage and job sections. Thus, if Z be originally connected at a 35-cent rate, which is, say, 5 cents too large, the equilibrium register will begin to act and the shaft which causes it to act will also cause the drum to act in the direction of a reduction of the rate, resulting in the reduction of the rate to 30 cents, or whatever other change may be necessary to produce the desired equilibrium. When the equilibrium register ceases to act, the automatic regulation of the drum will also cease. So, also, if a 20-cent workman is connected in, with no counteracting connection for a job, the action of the shaft operating on Q will promptly turn the drum to place a counterbalancing rate of 20 cents therein. The mechanics of this automatic control of the Z job will be given later.

P is a register connected to the power shaft PS, without having any direct connection with the other registers. It is always clutched in for registration, its function being to register the revolutions of the power shaft when in action, whether any of the work or job registers are clutched in for operation or not.

Although for simplicity of showing in the accounting diagram the relations between R and r, e. g., are shown as similar to the relations between a and A, there are two important differences which are brought out in Fig. 2. First, the registers, $r$, $s$, $t$, and $u$ (and all others of this section), instead of being adapted for time registration like A, B, C and D are adapted for money registration, like those of the job and wage sections, and each is connected with the driving shaft at the same ratio as its correlative, R, S, T or U. Second, instead of being necessarily associated in operation as are the pairs of time and wage registers, A and $a$, for example, $r$ and R, in this application, are not mechanically associated in their operation, as will appear in the description of Fig. 2, but are intended to be manually associated while accumulating and normally dissociated while decumulating. The method of operation of these two sections which have to do with cost-accounting is thus different from the method of operation of the time and wage sections. It will be seen that in the mechanical arrangement of the registers and their connections, up to the total registers R—Uz and r—uz, the two sections are identical, and it is the intention that they be operated identically when accumulating, and at the same time be capable of clearance separately. It will not be commonly the case that all registers of the job section will be ready for clearance at the same time but usually one job will be cleared while another is still unfinished.

Reverting to the clearance of the simpler sections: At the end of the week or other payroll period, it will be desirable to clear the time and wage sections. Before doing so, however, some record should be made of the details shown therein, which may be accomplished in various ways—preferably by photographing the front view of the machine, shown in Fig. 9. As evidence that the photograph is complete and legible, before the machine is cleared, the precaution may be taken of writing the pay checks or putting up the money for each workman according to the photographic record of his wage register, and if a separate summation of these pay checks agrees with the total shown in $a$—$d$ the clearance may then be safely made.

In clearing the time and wage sections, the differentials $dg3$ are locked against actuation and simultaneously the register $a$—$d$ $t$ is unlocked, this counter-operative action being mechanically secured by means of the lock $k$. Thereupon, the driving shaft is disconnected from the source of power actuation by shifting it to the extreme right as before explained, and by means of the crank the shaft may be reversed to any desired extent and at a rapid rate. The several time and wage registers may now be clutched in, which will result in the reduction of their readings in proportion to the speed of the shaft. Each of the primaries of either set, the time or the wage, may be watched and as it approaches zero the speed of the shaft may be reduced and the clutch thrown to put the registers out of action at the proper time to leave that pair of registers at zero. So with the remaining primary registers, preferably taking them in the order of their approach to zero. If any register is inadvertently reduced below zero, it may easily be restored to zero by a positive actuation of the shaft. When all the primaries of the time section, for example, are reduced to zero, those of the wage section must be in like condition, as must also the summating registers of each section, A—D and $a$—$d$. Through the intervening differentials the reading of $a$—$d$ has been transferred to $a$—$d$ $t$, which thus becomes an accumulating pay-roll register, showing the grand total of pay-rolls for any desired period. Owing to the locking of the differentials $dg3$ during this transference, the equilibrium registers have not been affected by this clearance process. The unlocking of the differentials $dg3$ permits the equilibrium registers to take up once more their function of indicating a discrepancy between the accumulation in the wage section and that in the job section, and such unlocking also necessarily counterlocks the transfer register $a$—$d$ $t$.

The clearance of the job section may be performed in essentially the same manner, the equilibrium registers being locked and the transfer register R—Uz $t$ being unlocked by means of the same lock $k$. On this side of the drawing, to economize space, the relative positions of the total and grand total registers, R—UZ and R—UZ $t$, have been changed slightly, but the operative relations are identical with those on the wage side, the differentials $dg4$ performing exactly the same function as that performed by the differentials between $a$—$d$ and $a$—$d$ $t$, so far as clearance is concerned. In the job section, however, it will rarely happen that all the jobs are to be cleared at the same time. Assuming that job R—U, for example, is finished and ready for clearance while job Z is still unfinished, the process of clearing the R—U group of registers will be the same as described for clearing the wage section, except that only registers R, S, T and U will be clutched in for the reversed actuation. When these four primaries are reduced to zero, so also will be R—U, and through the action of the differentials $dg5$ the amount cleared out of R—U will also be deducted from R—UZ, and in turn transferred to R—UZ $t$, where it will be combined with the total of all previously-transferred jobs. If, at the same time, job Z were also transferred, R—UZ would normally be clear, and if $a$—$d$ were also clear the totals transferred to the two general transfer or grand total registers, $a$—$d$ $t$ and R—Uz $t$, would differ by the amount in Q. Under ideal conditions, namely, with no discrepancies in the registration of wages and the registration of job-costs, Q would show zero, and the totals in the two transfer registers would be equal.

It may sometimes happen that a job is interrupted for a considerable time, or that for other reasons it is desired to use the registers assigned to one job for a different one. Specifically to provide for this contingency and, also, to illustrate further the flexibility of the machine, and the ease with which any reasonable requirement may be met, a special register R—UZ $s$ is also connected with the differentials $dg5$, and a lock $k2$ is shown which will permit the diversion of a transfer from either R—U or Z into the special register instead of into the general transfer register R—UZ $t$. The amount in the uncompleted job Z, for example, may thus be transferred to the special register, and there stored until the Z registers are once more available for resuming the accounting of the interrupted job, when the stored amount may be replaced in Z. By noting the amount thus stored at the time the transfer is made, the special register may be used for the storage of several interrupted jobs, each of which may be restored in turn as the registers are available. The large gears adjoining the registers R—UZ and R—UZ $t$ are merely to afford a convenient means of locking their respective registers.

The mechanical construction of the $z$ portion of the fourth section has been already described, in connection with Z of the job section. By suitable switches shown in the mechanical drawings (one of them K3 also shown in Fig. 1) the registers Z and $z$ may be cleared separately, though operated by the common clutches, cams and drum. The mechanical construction of the remaining portion of this fourth section is the same as that of the job section up to and including the registers R—UZ and R—UZ $s$, and its clearance is effected in all respects similarly to the clearance of the job section, except that this section is designed to be cleared at short intervals, daily, for example, in order that its current readings may afford a frequent progressive analysis and synthesis of the cost of the several jobs. No general transfer register is provided, as it would practically duplicate the one in the job section.

By the term synthelysis, used elsewhere in this specification, I mean the synthesis, in generic accounts, or more or less complex original data, concurrently with their analytic entry in more or less specific accounts. Since this is accomplished automatically in the present machine, it easily includes also the mechanical summation of the successive data of each primary account and the automatic generic summation in the various higher accounts of the results of such primary summations. Each of the four sections of this machine illustrates what is thus defined as synthelysis, but its specific use has been somewhat arbitrarily reserved for this fourth section because of the peculiar value of this double process in enabling the manager to keep in touch with the progress of the work. It will be observed that the daily total of this fourth section is also, approximately, at least, the daily total of the wage section as well. For example, the register $r$—$u$ may be employed to indicate the total cost charged to the job represented by the register R—U for any periods desired by the manager. The register $r$—$u$ may be independently connected with or disconnected from the shaft DS, as a result of which the synthesizing registers serving to actuate the register $r$—$u$ may be disconnected at the end of each day and such registers returned to zero to indicate the cost of the job for the next desired period. Again the totalizing register $z$ may be employed or not as desired to indicate the total operation of the register Z and the registers $r$—$u$—$z$ and $r$—$u$—$z$—$s$ may be employed as desired to indicate the grand totals of operation of the registers $r$—$u$ and $z$ or operation of these registers for any desired intervals, thus affording ready means by which the manager may secure costs on the several jobs in process for any desired intervals.

Having thus described the general operation and accomplishments of my machine, I will now proceed with the description of the mechanical details that enter into its construction.

Referring specifically to Fig. 2, the driving shaft DS is journaled in the two end walls 2 and 3 of the inclosing casing. At the left end of the shaft are loosely mounted the gears $dsg$, 5, 6 and 7, which mesh with gears 4', 5', 6' and 7' respectively. This last set of gears is loosely mounted on the shaft 8 by means of sleeves 9. Secured at the side of gears 4, 6 and 7 are gears 10, 11 and 12, respectively. These last mentioned gears engage respectively with gears 10', 11' and 12' loosely mounted on the shaft 13 by being sleeved thereon, as shown at 14. Gears *dsg* and 10 are rigidly connected together so as to always operate together. The same is true of gears 6, 11 and gears 7, 12. This rigid connection is readily secured, as will be seen from Fig. 7, by a pin 15 engaging both gears. During the normal or inoperative condition of the gears *dsg*, 10 or 6, 11 or 7, 12 this pin engages with a bar or standard 16 rigidly secured in the casing. As shown in Fig. 2, it will be seen that these standards 16 are spaced at suitable intervals along the shaft, one to the left of each gear or pair of gears on the shaft. Any suitable form of clutch mechanism may be employed for causing a normally inoperative connection between the gears on the driving shaft and the associated gears on the other shaft to become operative. Fig. 7 shows a convenient arrangement for accomplishing this purpose. A hub or collar 17 is rigidly connected with the shaft, upon which the gearing is loosely mounted. This collar carries a pin 18, which extends toward the clutch hub 19. This clutch hub is provided with a groove in which works the clutch lever 20, which carries a spring-pressed plunger 21. The coiled spring 22 normally tends to thrust this plunger outwardly, so that when the operating handle 23 is moved in an outward direction to operatively connect the registers with the shaft, the oppositely inclined surfaces 24 and 25 at the opposite end of the operating handle will cause the plunger to force the clutch hub to the right, that is, toward the pin 18 on the clamp 17. The moment this pin comes into alinement with the recess 26 the clutch hub will be locked to the collar and the two will rotate together. At the same time this movement of the clutch hub to the right will withdraw the pin 15 out of engagement with the standard 16, whereby the gear or gears associated with the clutch are locked to the shaft through the clutch and the collar. It should be said that the pin which normally locks each gear to its associated clutch hub is rigidly secured at one end to the clutch hub. When it is desired to interrupt the operative connection between the driving shaft and any particular gear, it is simply necessary to move the clutch handle upwardly, whereby the spring-pressed plunger of the clutch is cammed toward the right, as viewed in Fig. 2, whereby the clutch is moved to the left out of engagement with the collar 17 and into engagement with the standard 16 through the medium of the pin 15. This normal or inoperative position of the clutch is the position shown in Fig. 2. Of course it is apparent that any other suitable or convenient arrangement may be resorted to for readily connecting and disconnecting the driving shaft with any particular gear or gears which are normally loosely mounted thereon.

Supposing, now, for the sake of illustration, that the first clutch at the left of Fig. 2 has been thrown into operative position. In that case the rotation of shaft DS will be accompanied by a corresponding rotation of the gears *dsg*, 10. The gear 10 will drive the gear 10′, which, as above stated, is in mesh with gear 10. The gear *dsg* will drive the gear 4′ on shaft 8. Beside the gear 4′ is mounted the gear *rg*1, which is connected with the register A, as indicated in Fig. 1. In order to prevent confusion in Fig. 2 it has been thought best to omit altogether the registers and merely to show the gears that actuate such registers. Mounted on the same sleeve as gear 10′ is gear 27, arranged to actuate register *a*, as indicated in Fig. 1. It will thus be seen that the rotation of gear *dsg* is communicated to the time register A, while the rotation of gear 10 is communicated to the corresponding wage register *a*. As previously explained, the ratio of transmission between gears *dsg* and 4′ and the ratio of transmission between gears 10 and 10′ are such that the elapsed time indicated by the time register A is represented by the wage indications of the associated wage register *a* at a predetermined rate. A rotation of gear 5 is transmitted on the one hand to gear 5′, sleeved on the shaft 8, and on the other hand is transmitted to gear 28, sleeved on the shaft 13. Mounted on the same sleeve with gear 5′ is the register gear 29 which is arranged to drive register B. Mounted on the same sleeve with gear 28 is the register gear 30, arranged to drive the corresponding wage register *b*. Mounted loosely on the shaft 8 between the sleeve portions that carry the register gears *rg*1 and 29 is the central member 31 of the differential gear *dg*, the side members 32 and 33 of which are mounted respectively upon the sleeve portions that carry register gears *rg*1 and 29. The particular form of differential gearing herein used is shown in detail in Fig. 8, wherein it will be seen that the central member 31 is provided upon opposite sides thereof with bearing portions 34 and 35, shown in the form of arc-shaped strips. These strips form each the bearing for the outer ends of shafts 36 and 37, upon which are mounted the pinions 38 and 39 respectively, arranged to mesh with each other. The pinion 38 engages with the toothed gear 32, while the pinion 39 engages with the teeth of the gear 33, so that if gear 32 be rotated and gear 33 be stationary the rotation of gear 32 will be transmitted to the central member 31 at the same rate. If, however, also the gear 33 be rotated, it is plain to see that the rotation of 31 will represent the sum of the rotations of side members 32 and 33.

As seen from Fig. 2, the central member of differential gear *dg* is in mesh with the gear $rg2$ arranged to actuate the time register AB. From this it will be seen that the actuations of register gears $rg1$ and 29 will be summated in the register gear $rg2$, from which it follows that the register AB will be actuated at a rate equal to the sum of the rates of actuation of individual registers A and B. It is believed that this description of the set of differential gears will be sufficient to permit a ready understanding of the action of the other sets of differential gears, whereby the desired summation is accomplished in the various arrangements shown. It will now be apparent that the rate of actuation of register gears 27 and 30 will be summed up in the register gear 40, which is arranged to drive the wage register $ab$. Also in the same way the rates of actuation of register gears 41 and 42, sleeved on the shaft 8, will be summed up in register gear 43, which controls the time register CD, it being understood that the gear 41 controls register C and gear 42 controls register D. In the same manner the rates of actuation of register gears 44 and 45, sleeved on the shaft 13, are summed up in the register gear 46, sleeved on the shaft 47. Inasmuch as the gears 44 and 45 control the wage registers $c$ and $d$ respectively, it will be apparent that the wage register $cd$ controlled by 46 will indicate the sum of the indications of the individual registers $c$ and $d$. This summation process is carried in the instance illustrated one step farther; that is to say, the register gears $rg2$ and 43, which are sleeved on shaft 48, total into the register gear $rg3$ through the differential gear $dg2$. Similarly register gears 40 and 46 total into register gear 49 through the differential gear 50. In other words, gear $rg3$, which controls the final summation register A—D, will operate at a rate which is equal to the sum of the rates at which any combination of the individual registers operates, and inasmuch as the actuation of any particular time register is essentially accompanied by a corresponding actuation of the associated wage register, it is clear that the indications in the final summation register A—D will be represented in wages in the indications of the final summation of wage register $a$—$d$. I should state at this point that the precise form of differential gearing herein shown is by no means necessarily employed. Any convenient form of gearing that would readily lend itself to the purposes herein set forth might as well be adopted.

From the descriptions thus far given of the mechanical connections and arrangements shown in Fig. 2, it will be readily understood how the operation of the time section and wage section may be mechanically effected.

In giving now the description of the mechanical disposition of the parts that comprise what has been termed the "job" section, it will, of course, not be necessary to enter into the details given in connection with the description of the time section and the corresponding wage section, for the reason that the clutch mechanism and differential gearings are identical with those already described in detail in the immediately preceding portion of the specification.

The clutches that control the job section containing individual registers $r$—$u$ and R—U are indicated in Fig. 2 by reference letters 51 to 57', inclusive. Clutch 51 controls gear 58, which meshes with gear 58', loosely sleeved on shaft 8. On the same sleeve is mounted the register gear 59, arranged to actuate the job register $r$. Clutch 52 controls gear 60, which meshes with gear 61, sleeved loosely on shaft 13. On the same sleeve with gear 61 is mounted the register gear 62 connected with register R. It will thus be seen that the operation of clutch 51 to throw in register $r$ is entirely disconnected from the operation of clutch 52 to actuate register R. In other words, to throw in registers $r$ and R simultaneously, it is necessary to actuate the clutches 51 and 52 respectively. The purpose of thus having an optional connection of register $r$ and register R (or between any of the registers on one side of the job section with any registers on the other side of the job section) has already been fully set forth in a preceding portion of this specification. Clutch 53 operates gear 63, which meshes with gear 64, sleeved loosely on shaft 8. Mounted opposite gear 64 on the same sleeve is the register 65 for actuating the job register $s$. The register gears 59 and 65 are connected through the differential gear 66, which engages with the gear 67 arranged to drive the register $rs$. From this it will be seen that the rate of actuation of register $rs$ will be the sum of the rates of actuation of registers $r$ and $s$. Clutch 54 controls gear 68, which meshes with gear 69, loosely sleeved on shaft 13. Mounted on the same sleeve with gear 69 is the register gear 70, arranged to control the job register S. Register gears 62 and 70 are connected by the differential gear 71, which meshes with the register gear 72 for controlling register RS. Thus the rate of actuation of register RS will always be the sum of the rates of actuation registers R and S. Clutch 55 controls gear 73, which meshes with gear 74, loosely sleeved on shaft 8. Mounted on the same sleeve with this gear is register gear 75, which controls register $t$. Clutch 56 controls gear 76, which meshes with gear 77, loosely sleeved on the shaft 13. Mounted on the same sleeve with gear 77 is the register gear 78, which controls the register T. Clutch 57 controls gear 79, which meshes with gear 80, loosely sleeved on the shaft 8. Mounted beside gear 80 is the register gear 81, which controls a register $u$. Register gears 75 and 81 are connected by the differential gear 82, which meshes with register gear 83 for controlling the register $tu$, whose rate of actuation will be the sum of the rates of actuation of the registers controlled by gears 75 and 81. Clutch 57′ controls gear 84 which meshes with gear 85, loosely sleeved on shaft 13. Mounted on the same sleeve with the gear 85 is register gear 86 for controlling the gear U. Gears 78 and 86 are connected by the differential gear 87, which engages register gear 88 for controlling the register TU. Gears 72 and 88 are connected by the differential gear 89 which meshes with the register gear 90 for controlling the summation register R—U. Register gears 67 and 83 are connected by the differential gear 91, which meshes with the register gear 92 for controlling the summation register $r$—$u$.

Referring now to the second job section, comprising registers $z$ and $Z$: A series of clutch numbers 93, 94, 95 and 96 are mounted on the right portion of the driving shaft DS. Clutch 93 controls gear 97, which meshes with gear 98, sleeved loosely on the shaft 8. Clutch 94 controls gear 99, which meshes with gear 100, sleeved loosely on the shaft 8. Gears 98 and 100 are connected by the differential 101, which engages the gear 102, sleeved loosely on shaft 48. Clutch 95 controls gear 103, which meshes with gear 104, sleeved loosely on shaft 8. Clutch 96 controls gear 105, which meshes with gear 106, sleeved loosely on shaft 8. Gears 104 and 106 are connected by the differential 107, which engages gear 108, sleeved loosely on shaft 48. Gears 102 and 108 are connected by differential 109, engaging gear 110, sleeved loosely on shaft 111. The motion of gear 110 is transmitted through the differential 112 to gear 113, which actuates the job register $z$. Gears 92 and 113 are connected by the differential 114, whose central member engages with the central member of differential gear 115, mounted loosely upon the shaft 116. Situated upon opposite sides of this differential 115 are gears 117 and 118. Upon the sleeve carrying gear 117 is mounted register gear 119 for controlling register $r$—$uz$. Mounted upon the same sleeve with gear 118 is the register gear 120, which controls the register $r$—$uzs$. As stated in my description in connection with Fig. 1, the locking arrangement $k3$ is so disposed with relation to the gears 117 and 118 that when one of these gears is locked the other is unlocked. As previously explained, the normal condition of gear 117 is an unlocked one, while gear 118 is normally locked. In this way registers $r$—$uz$ and $r$—$uzs$ can under no circumstances operate simultaneously. In order to permit clearness and all possible simplicity in Fig. 2, I have not deemed it advisable to illustrate the details of the locking device $k3$.

Fig. 3 shows the operation of a finished form of such a locking arrangement. The rod 121 is operatively connected with the shaft 122 by means of link 123. Rigidly secured to this rotatable shaft are two arms 124 and 125, the first of the two arms being disposed behind the other, as viewed in Fig. 3. In Fig. 2 are shown the gear engaging portions of these arms. Thus it will be noted that the part indicated by 124 in Fig. 2 is in engagement with the bottom gear 118, while the portion indicated by 125 is in engagement with the top gear 117. Inasmuch as these arms are rigidly fastened to the shaft, it will be readily understood that a rocking of the shaft 122 will cause one of the arms to engage its associated gear and at the same time cause the other arm to break connection with its gear. As seen in Figs. 3 and 4, the rod 121 projects beyond the top of the casing and is provided with a knob to permit ready manipulation. The combined actuation of registers $r$—$u$ and $z$ will thus be transmitted through gear 119 or gear 120, depending upon the position of the arms 124 and 125 of locking device $k3$. It will be observed that with the parts as shown in Fig. 2 the motion of $z$ will be transmitted to gear $v$• through the differential 112. The movements of gear $v$, which is loosely sleeved on shaft 111, will normally be transmitted to gear $w$, loosely sleeved on shaft 126. This transmission from gear $v$ to gear $w$ takes place through idler 127, loosely mounted on shaft 48, idler 128, loosely mounted on shaft 8, thence through idlers 129, 130, 131 and 132. Idlers 129 and 130 are mounted side by side on driving shaft Ds and are normally connected together. In order, however, to sever this connection so as to prevent the transmission of motion from $v$ to $w$, I have provided a suitable locking device in the form of an adjustable clutch 133 under the control of the handle $Z'$. It will not be necessary at this point to present in detail the connection between handle $Z'$ and clutch 132, for the reason that this connection is the same as that already described in connection with the other clutches. When clutch handle $z'$ is in its normal or upward position, as shown in Fig. 8, the gears 129 and 130 are connected together by a pin on the clutch 133. When the handle is moved downwardly the clutch hub 133 is moved to the right, withdrawing the pin from gear 130, whereby operative connection between gears 129 and 130 is broken, and the actuation of register $z$ would not be transmitted from $v$ to $w$.

Inasmuch as the register gear 134 which controls the register $Z$ is mounted upon the same sleeve with gear $w$, it is apparent that with the gears 129 and 130 locked and with the other parts in the positions shown, the actuation of register $z$ will be transmitted from $v$ through the series of idlers above mentioned to $e$ and thence to register Z. The locking arrangement $k4$ is provided, as already explained in connection with Fig. 1, to prevent actuation of the register $z$ when this is desired under certain circumstances. Thus a means is provided for permitting the actuation of the totalizing register $z$ during any desired interval, as a result of which the manager may have an indication of the amount of actuation of the totalizing register Z for each day or any portion of the day or for any interval of time desired in order to check any particular differences that may arise in the factory. This locking arrangement comprises a sleeve 135 mounted loosely on the shaft 116. This sleeve is rigidly secured thereby upon opposites of gears 136 and 137. The yoke 138 engages loosely in the groove on the sleeve and is operated from without the casing by the projecting head 139.

In order that the position of the sleeve 138 might be ascertained by the mere position of the head, I have provided the latter with a small pointer 140. When the locking device is in the position indicated in Fig. 2 the pointer 140 will be opposite the mark 141. When the head is moved in a clockwise direction to bring the pointer opposite mark 142 the sleeve 138 will have been moved to the left a sufficient distance to cause disengagement between gear 137 and differential 112 and to cause engagement of the gear 136 with the projection 143 on the standard or partition 144. In this way gear 136 will be prevented from rotation, and so will the register $z$, for the reason that the gear 145 mounted on the same sleeve with register gear 113 is in mesh with locked gear 136. Gears 90 and 134 are connected by the differential 146, which is in turn connected with differential 147, loosely mounted on shaft 148. Secured to sleeve 149 and 150 on the shaft 148 upon opposite sides of the differential 147 are the two register gears 151 and 152. Gear 151 is arranged to control register R—UZ, while gear 152 is arranged to control register R—U$zs$. Secured to sleeve 149 is the gear 153, and secured to sleeve 150 is the gear 154. The locking arrangement represented generally by $k2$ is so arranged that when its arm 155 is in engagement with gear 153 the other arm 156 will be out of engagement with its associated gear 154 or vice versa. Inasmuch as the mechanical construction of this locking arrangement is identical with the construction described in connection with the locking device $k3$, it is not deemed necessary to describe in detail locking device $k2$. Fig. 3 may be referred to for showing portions of the arms 155 and 156. The purpose of this locking arrangement has already been fully set forth in connection with the description of Fig. 1. On shaft 126 are loosely mounted the sleeves 157 and 158 connected by differential 159. On sleeve 157 is mounted the register gear 160, which is arranged to control register $a—dt$. The sleeve 161, likewise mounted loosely on the shaft 126, carries the register gear 162 arranged to actuate the register R—UZ $t$. Mounted upon the sleeves 157 and 161 are gear wheels 163 and 164 respectively. The sleeves 165 and 166 are connected by the differential $dg3$, while sleeves 166 and 149 are connected by the differential $dz4$. This last mentioned differential engages with the register gear 162. Mounted upon the sleeves 165 and 166 are gear wheels 167 and 168, respectively. Associated with this set of gears is the locking arrangement $k$, which in construction is shown similar to the locking arrangements previously mentioned and described. However, locking device $k$ has its arms 169 and 170 so arranged that when in one position they lock the gears 163 and 164, and when in the other position they lock the gears 167 and 168. The purpose of this peculiar locking has been fully set forth in connection with Fig. 1. Mounted upon the sleeve 165 is gear wheel $dd$ in engagement with the differential 159. With the locking arrangement $k$ in position to lock the gears 163 and 164 the motion of the differential 159 will be transmitted through $dd$ to differential $dg3$. On shaft 171 near the lower end of the casing is rigidly mounted the register gear $Qd$, which is arranged to control the register Q. Mounted loosely on this same shaft are two gears 172 and 173, the first being arranged to control the register $Qw$ and the second to control the register $Qj$, and these register gears are provided with hubs 174 and 175 respectively, having teeth mounted in opposite directions. Associated with hub 174 is the ratchet hub 176 slidably mounted on the shaft. A similar hub 177 is mounted on the shaft in a similar manner to coöperate with hub 175. The slidable hubs 176 and 177 are pressed into engagement with their associated hubs 174 and 175 by means of coiled springs 178. With this arrangement it will be readily understood that when the shaft 171 rotates in a direction say toward the observer gear 173 will remain stationary owing to the sliding of the teeth on the hub 177 over the teeth on the hub 175. When the shaft rotates in an opposite direction, that is to say, toward the observer, then gear 172 remains stationary and gear 173 is rotated. The purpose of this arrangement has been set forth in connection with Fig. 1.

In connection with the operation of the clutches 93 to 96 there remains to be described the arrangement whereby these clutches may be selectively operated to send into register $z$ any desired rate of actuation. Rigidly mounted upon the shaft 47 are disks 179, 180, 181 and 182. These disks are each provided with a cam surface so constructed that it corresponds to a certain predetermined rate of actuation of the particular register the associated clutch mechanism of which is under the control of the cam surface. In order to make my meaning clear, I call attention to Fig. 5, which shows in plan a development of the cam surfaces on the four disks. It will be observed that disk 179 is provided with eight grooves or notches uniformly spaced. The position of these notches may be regarded as corresponding to a five cent rate, as indicated in the figure. The disk 180 is provided with four elongated grooves, each representing a ten cent rate. A disk 181 is provided with a pair of opposite grooves subtending a larger angle than the grooves on the disk 180. Finally, the disk 182 has its periphery divided into two concentric portions connected by grooved surfaces. The two grooves on the disk 181 represent a twenty cent rate, while the grooved surface of smaller diameter on disk 182 represents a forty cent rate. As indicated by the dotted radial lines in Fig. 5, assuming the rate indications of the grooves on the different disks as just given, it will be observed that it is possible to make combinations whereby any rate from five cents to seventy-five cents per hour may be sent into the register $z$. To make it clear how the cam surfaces on the disks control the rate of actuation of register $z$, attention is again directed to Fig. 2. It will be observed that the clutches 93, 94, 95 and 96 are provided respectively with levers 183, 184, 185 and 186, similar to the levers described previously in connection with other clutch mechanisms herein shown. Pivoted to a stationary piece 187 at 188 are the arms 189. At their free ends these arms are each provided with a head 190, carrying on one side a roller 191 and on the other a roller 192. A coiled spring 193 is situated between each arm and a stationary support 194, the tendency of these springs being to force the arms 189 to the right, as viewed in Fig. 2. It will thus be seen that whenever a roller 192 comes opposite a groove on a disk the spring 193 will immediately force the arm to the right, thereby causing the spring-pressed plunger on the clutch lever to ride over the roller 191 and thus to force the particular clutch to the right, thereby establishing operative connection between the driving shaft and the gear associated with the clutch. For example, if the disk 179 is rotated until the roller 192 slides into one of the grooves, the clutch 93 will operate to connect the gear 98 with the driving shaft. The ratio of transmission between gears 97 and 98 corresponds to a five cent rate. Now by rotating the shaft 47 it is possible to cause any one of the rollers 192 to engage with the grooves in any particular disk or disks, whereby any combination may be obtained from five to seventy-five cents, as already stated.

In order to indicate just what particular rate of actuation is being sent into the register $z$ by the operation of the cam surfaces of the disks, I have mounted a drum $x$ on the shaft 47. This drum is provided with numbers, which, as they come opposite the sight opening 194, indicate the particular rate of actuation of the register $z$. This sight hole is arranged at the bottom of a pyramidal shaped hood 195. Of course, I do not wish to be understood as in any way limiting myself to this precise arrangement for indicating the desired gear ratio. Any convenient indicator may be employed, so long as its indications are primarily controlled by the rotation of the shaft 47. Mounted opposite the drum is a gear 196, which meshes with an idler 197, this latter in turn engaging the gear 198 rigidly mounted on the short shaft 199, to which is attached the crank Cr2. At the inner end of this short shaft is slidably mounted the ratchet hub 200, which is normally pressed into engagement by coiled spring 201 with the ratchet hub 202 upon the adjacent end of shaft 171. With the parts in the position shown in Fig. 2 rotation of the shaft 171, due to the actuation of register Q, will be accompanied by a corresponding rotation of shaft 199, with the result that the shaft 47 will receive rotation through the gearing 198, 197 and 196. This automatic adjustment of the shaft 47 by the register Q will cause the operation of one or more of the clutches 93, 94, 97 and 96 to regulate in a compensating manner the rate of actuation of register $z$. In order to provide means for interrupting this automatic regulation I have arranged a cam 203 in proximity to the lever 204, which engages the hub 200. This cam 203 is operated from without the casing by the head 205. With the pointer 206 on this head in the position shown in Fig. 9 the cam will be in the position shown in Fig. 2, and the connection between shafts 171 and 199 will be established. If the head 205 be turned to bring the pointer 206 opposite the mark 207 cam 203 will have forced the lever 204 to the right, thereby carrying hub 200 out of engagement with hub 202 and breaking connection between shafts 171 and 199. With the connection thus interrupted the disks of the shaft 47 may still be adjusted by manually turning the shaft 199.

I have stated in connection with the description of Fig. 1 that the gear connection between the power shaft PS and the driving shaft DS is an adjustable one so that the ratio of transmission between the shafts may be varied to suit certain conditions. This adjustment may be effected in various ways, and I have shown a convenient arrangement for accomplishing the purpose. To the inner end of the power shaft is secured the gear 208, which meshes with the gear 209, fixed on the short shaft 210. A pair of gears 211 and 212 are slidably arranged on the shaft 210. These two gears are permanently connected together and to the clutch hub 213 likewise loosely mounted on the shaft 210. The curved arm 214 is in loose engagement with the clutch hub 213 and at the opposite end is rigidly secured to the upwardly extending shaft 215. This shaft is rotatably mounted in the casing and is controlled by the arm 215 mounted upon the outside of the casing, as shown in Figs. 3 and 9. Fixed upon the driving shaft DS are the gear wheels T1 and T1½, spaced by sufficient distance to permit engagement with only one of the gears 211 and 212 at one time. With the arm 216 in the position shown in Fig. 9 the position of the gear connection between the power shaft and the driving shaft is indicated in Fig. 2; that is to say, gear 208 is in engagement with gear T1 and the ratio of transmission is unity or, in other words, the time registers will indicate straight time. If the arm 216 be moved opposite the mark 217 the grooves 211 and 212 will be shifted a little to the left so that the gear 210 will now be in engagement with gear T1½, leaving gear 208 out of engagement with T1. In this second position of the gears the ratio of transmission is changed to greater than unity. In the particular instance illustrated it is changed to 1½, which simply means that the time registers will indicate 1½ time instead of straight time. If the arm 216 be moved still farther to the right opposite the mark 218, then the gear 211 will be shifted out of engagement with gear T1½ and the operative connection between the power shaft and the driving shaft will be interrupted. The shaft CS which is driven by a clock has fixed thereon a gear 219, which, meshing with the gear 208, transmits motion of the shaft CS to the shaft PS for the purpose of controlling the same. In order to establish synchronism between the clock shaft CS and the power shaft PS I employ a pair of cams 220 and 221, the former being rigidly connected with the shaft CS, while the latter is loosely sleeved on said shaft. Operatively associated with these cams is an arm 222 pivoted at 223. This arm carries a roller 224 arranged to ride over the peripheries of the cams. Should the motor drive the power shaft at a speed greater than the speed of rotation of the shaft CS, the cam 221 will be rotated until the roller 224 drops into the cam portion 225, thereby causing the arm 222 to move first opposite the contact button 226 and then immediately thereafter opposite the contact button 227. It should be stated that the free end of this arm carries a contact brush 228, adapted to span the contacts with the segment 229. This arrangement is nothing more than an adjustable resistance box for controlling the speed of an electric motor by varying the resistance in its circuit. Thus with the arm in the position indicated in Fig. 4 all of the resistance will be cut out of the motor circuit. When the arm is moved into engagement with the contact 226, there is inserted a certain amount of resistance in the motor circuit and the moment the contact brush leaves the contact 226 the motor circuit is interrupted and the speed of the power shaft decreased. In such event the clock shaft will have a higher speed and consequently cam 220 will be rotated until its projecting portion 230 forces the arm upwardly into the position indicated in Fig. 4. In this way the speed of the power shaft is alternately above and below the speed of the clock shaft, with the result that the average speed of the power shaft is synchronous with the rotation of the clock shaft. In order to provide for an indication of the length of time during which the power shaft has been running, irrespective of whether or not it is in or out of operative relation with the driving shaft, I provide a register O, which is actuated by the gear 230 securely fixed to the shaft 210.

The front view of the machine shown in Fig. 9 is assumed to be taken just after the workmen have "rung out" at six o'clock on a Monday evening, after the machine has been in use and has accumulated data for a number of weeks. A and B are shown as having lost some time on this particular day, the former .2 of an hour and the latter .1 of an hour, while C and D worked full time. The total time worked by the four men in that payroll period is therefore 39.7 hours, and the total wages earned $5.98. The daily synthelysis section shows the distribution to jobs of the day's wages, as follows: to $r—u$ $5.54 and to $z$ 23 cents, a total of $5.77, leaving 21 cents as the value of the undistributed wages for the day, which is shown in $q$ and in $qw$, these "trip" portions of the registers having been set back to zero before beginning the day, as were also the daily synthelysis registers as a whole. The total undistributed wages to date, including the 21 cents accruing on the day in hand, is shown on the principal portion of the excess wages register $Qw$, as $57.49, while the corresponding showing of an excess of distribution to jobs is shown in $Qj$ as 24 cents, leaving in Q a net excess of wages earned over the amount actually distributed, $57.25. This triple showing of excess, namely, gross wage excess, gross job excess and net (wage) excess, is desirable for the following reasons: Ordinarily there should be no excess of jobs over wages, as is shown in $qj$, for the day. The 24 cents in $Qj$ represents the total of wholly inadvertent and erroneous excessive distribution of wages to specific jobs. The $57.49 in $Qw$ includes any corresponding inadvertent deficiencies in the distribution of wages to jobs, but, for the most part, it represents real wasted time, that is, time not chargeable to any specific job nor to the general miscellaneous production which is herein known as job Z. Were it not for these two gross registers, idle time of a given hour or day mightly be wholly or partly offset by a subsequent excessive distribution, and would thus leave no trace of either of these undesirable showings. As here shown, however, it must appear in the excess wage register or must be currently charged to a specific job or to general work $z$. As shown elsewhere, the charges to job Z may be automatically governed by the current excess in Q, and this current excess may reciprocally be quickly reduced to zero; but, if desired, this automatic control may be arrested by the switch K5, and then only volitional charges will be entered in Z. As shown K5 is set for the automatic control; if thrown to the left, the control would be arrested. The daily synthelysis shows that of the $5.98 earned for the day assumed, $5.54 was charged to $r$—$u$, leaving 21 cents' worth of idle time. The job section shows a total of $11.66 charged to R—U to date, and $17.28 to Z, a grand total for jobs in process of $28.94. This amount, plus the total for previous jobs finished and transferred, R—U$z$ $t$, $887.29, plus the net value of lost or idle time, $57.25, makes the same total, $973.48, that is obtained by adding the wages for the current period, $5.98, to those of all previous periods, $967.50.

As shown in Fig. 9, all men have just "rung out" for the day, indicated by the levers A'—U' extending upward, and the thing next in order is to clear the daily synthelysis. This may be effected by setting for operation the levers $r'$, $s'$, $t'$ and $u'$, that is, having them extend downward, and reversing the actuating shaft until the corresponding registers are cleared, throwing out each lever as its register reaches zero. In clearing $x$, the drum $x$ may be set to indicate any convenient rate, and the shaft may be reversed as for $r$—$u$, but care should be taken to throw the lever Z' downward toward the position indicated by ($z$), so as not at the same time to clear the 23 cents out of Z. As it is shown in the figure it is set for coöperative actuation of Z and $z$. If R—U has been finished and its registers are to be cleared, the process is similar: throwing the levers R', S', T' and U' downward for operation and reversing the shaft, having previously thrown the switch K so as to lock Q and unlock R—UZ $t$. If desired, Z may also be cleared into R—UZ $t$ by setting the drum at some convenient rate, throwing the switch K to disconnect from Q and reversing the shaft. Ordinarily, in clearing Z the register $z$ is also operated without special attention, and care should be taken, when $z$ has reached its zero showing, to release it from further decumulative operation by throwing the switch K4 from its coöperative position (141) to its position for single operation (142). K2 and K3 are the switches which govern the transfers into R—UZ $s$ and $r$—$uzs$, as heretofore explained. These special transfer registers are shown here as having nothing in them. P and $p$ are the double power-register, the latter portion $p$ showing the connection of the machine with the power supply for 10 hours for the day, and the former showing a total of 1622.5 hours for the total to date. T$i$ is the index or switch which indicates and controls the rate at which the driving shaft DS revolves, being set, in the figure, for straight or normal time, at T$s$. When shifted to O$t$, the shaft revolves at fifty per cent. greater speed, for the over time, and when shifted to the extreme right, N$t$, the shaft is entirely disconnected from the source of power.

I claim—

1. In an accounting mechanism, the combination of a time-controlled driving shaft, a plurality of wage registers associated therewith, means for operatively connecting any one of said wage registers, or any number thereof, with said shaft in a suitable transmission ratio, a plurality of cost registers associated with said shaft, means for operatively connecting any one of said cost registers or any number thereof with said shaft in a suitable transmission ratio, and means for indicating the relation between the amount of actuation of the wage registers and the amount of actuation of the cost registers.

2. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, and means for indicating the relation between the amount of the actuation of the wage registers and the amount of actuation of the cost registers.

3. In an accounting mechanism, the combination of a time-controlled driving shaft, a plurality of wage registers associated therewith, means for operatively connecting any one of said wage registers or any number thereof with said shaft in a suitable transmission ratio, a plurality of cost registers associated with said shaft, means for operatively connecting any one of said cost registers or any number thereof with said shaft in a suitable transmission ratio, a differential connection between the wage registers and the cost registers, and an equilibrium register controlled by said connection for indicating the relation between the amount of actuation of the wage registers and the amount of actuation of the cost registers.

4. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, a differential connection between the summation wage register and the summation cost register, and an equilibrium register controlled by said connection for indicating the relation between the amount of actuation of the wage registers and the amount of actuation of the cost registers.

5. In an accounting mechanism, the combination of a time-controlled driving shaft, a plurality of wage registers associated therewith, means for operatively connecting any one of said wage registers or any number thereof with said shaft in a suitable transmission ratio, a plurality of cost registers associated with said shaft, means for operatively connecting any one of said cost registers or any number thereof with said shaft in a suitable transmission ratio, means for indicating the relation between the amount of actuation of the wage registers and the amount of actuation of the cost registers, and means for indicating the components of the result expressing such relation.

6. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, means for indicating the relation between the amount of the actuation of the wage registers and the amount of actuation of the cost registers, and means for indicating the components of the result expressing such relation.

7. In an accounting mechanism, the combination of a time-controlled driving shaft, a plurality of wage registers associated therewith, means for operatively connecting any one of said wage registers, or any number thereof, with said shaft in a suitable transmission ratio, a plurality of cost registers associated with said shaft, means for operatively connecting any one of said cost registers or any number thereof with said shaft in a suitable transmission ratio, means for establishing connection between the wage registers and the cost registers, and means for indicating the total excess of the actuation of one set of registers over the actuation of the other set of registers.

8. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, means for establishing connection between the summation wage register and the summation cost register, and means for indicating the total excess of the actuation of one summation register over the actuation of the other summation register.

9. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, means for establishing connection between the summation wage register and the summation cost register, means for indicating the total excess of the actuation of one summation register over the actuation of the other summation register, an alarm signal, and means for operating the alarm signal during the unbalanced actuation of the wage and cost registers.

10. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, means for establishing connection between the summation wage register and the summation cost register, means for indicating the excessive actuation of one summation register over the other summation register, and a signal for indicating the nature of such excessive actuation.

11. In an accounting mechanism, the combination of a time-controlled driving shaft, a plurality of wage registers associated therewith, means for operatively connecting any one of said wage registers or any number thereof with said shaft in a suitable transmission ratio, a plurality of cost registers associated with said shaft, means for operatively connecting any one of said cost registers or any number thereof with said shaft in a suitable transmission ratio, a differential connection between the wage registers and the cost registers, a countershaft geared to said differential connection, an equilibrium register actuated by said countershaft for indicating the relation between the amount of actuation of the wage registers and the amount of actuation of the cost registers, an auxiliary register adapted to be actuated by the countershaft only upon rotation thereof in one direction.

12. In an accounting mechanism, the combination of a time-controlled driving shaft, a plurality of wage registers associated therewith, means for operatively connecting any one of said wage registers or any number thereof with said shaft in a suitable transmission ratio, a plurality of cost registers associated with said shaft, means for operatively connecting any one of said cost registers or any number thereof with said shaft in a suitable transmission ratio, a differential connection between the wage registers and the cost registers, a countershaft geared to said differential connection, an equilibrium register actuated by said countershaft for indicating the relation between the amount of actuation of the wage registers and the amount of actuation of the cost registers, an auxiliary register adapted to be actuated by the countershaft only upon the rotation thereof in one direction, and a second auxiliary register adapted to be actuated by the countershaft only upon rotation thereof in the other direction.

13. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a transfer register associated with said summation register, a normally ineffective reverse connection between the transfer register and the summation register, and means for rendering said connection effective.

14. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, a pair of transfer registers associated with said summation registers, a normally ineffective reverse connection between each of said transfer registers and its corresponding summation register, and means for simultaneously rendering said reverse connections effective, whereby the amount indicated by each summation register may be transferred into its transfer register.

15. In an accounting mechanism, the combination of a time-controlled driving shaft, a plurality of individual wage registers associated therewith, a summation register for indicating the total of the actuations of said individual wage registers, means for operatively connecting any one of said wage registers or any number thereof with said shaft in a suitable transmission ratio, a plurality of individual cost registers associated with said shaft, a summation register for indicating the total of the actuations of said individual cost registers, means for operatively connecting any one of said cost registers or any number thereof with said shaft in a suitable transmission ratio, a pair of transfer registers associated with said summation registers, a normally ineffective reverse connection between each of said transfer registers and its corresponding summation register, a normally effective differential connection between said summation registers, an equilibrium register controlled by said differential connection for indicating the relation between the amount of actuation of the summation wage register and the amount of actuation of the summation cost register, and means for rendering one of said reverse connections effective and simultaneously rendering said differential connection ineffective.

16. In an accounting mechanism, the combination of a time-controlled driving shaft, a power shaft arranged to be geared thereto, a plurality of wage registers associated with said driving shaft, gearing for operatively connecting any one of said wage registers or any number thereof with the driving shaft in a suitable gear ratio, and an adjustable gear connection between the driving shaft and the power shaft for changing the rate of actuation of the registers.

17. In an accounting mechanism, the combination of a time-controlled driving shaft, a power shaft arranged to be geared thereto, a plurality of wage registers associated with said driving shaft, gearing for operatively connecting any one of said wage registers or any number thereof with the driving shaft in a suitable gear ratio, a countershaft associated with said driving shaft and power shaft, a permanent gear connection between said countershaft and power shaft, an adjustable gear connection between said countershaft and driving shaft, and readily accessible means for adjusting said last mentioned gear connection whereby the rate of actuation of the registers may be altered or the connection between the driving shaft and the power shaft interrupted.

18. In an accounting mechanism, the combination of a driving shaft, two independent sets of primary cost registers separately associated therewith, the individual registers of one set corresponding respectively with the individual registers of the other set, gearing for operatively connecting any one of said registers with said shaft independent of any other primary register or registers.

19. In an accounting mechanism, the combination of a driving shaft, a plurality of individual cost registers associated therewith, a summation register for indicating the total of the actuations of said individual cost registers, a gear connection between each individual register and the shaft, a clutch for separately controlling each gear connection, a second shaft associated with said driving shaft, a plurality of disks mounted on said second shaft and provided each with a cam surface operatively connected with a clutch, means for rotating said second shaft to select various combinations of cam surfaces for operating one or more of the clutches whereby the summation register is actuated at the desired rate, and means controlled by the cam shaft for indicating such rate.

20. In an accounting mechanism, the combination of a time-controlled driving shaft, a set of wage registers associated therewith, means for operatively connecting any one of said wage registers or any number thereof with said shaft in a suitable transmission ratio, a set of cost registers associated with said shaft, means for operatively connecting any one of said cost registers or any number thereof with said shaft in a suitable transmission ratio, a differential connection between the wage registers and the cost registers, an equilibrium register controlled by said connection for indicating the relation between the amount of actuation of the wage registers and the amount of actuation of the cost registers, a second set of cost registers associated with the driving shaft, a summation register for indicating the total of the actuations of said second set of cost registers, a gear connection between each individual register and the shaft, a clutch for separately controlling each gear connection, a second shaft associated with said driving shaft, a plurality of disks mounted on said second shaft and provided each with a cam surface operatively connected with a clutch, and a connection between said equilibrium register and said second shaft whereby the actuation of the equilibrium register causes corresponding rotation of said second shaft to properly adjust the rate of actuation of said last mentioned summation register.

21. In an accounting mechanism, the combination of a time-controlled driving shaft, a set of wage registers associated therewith, means for operatively connecting any one of said wage registers or any number thereof with said shaft in a suitable transmission ratio, a set of cost registers associated with said shaft, means for operatively connecting any one of said cost registers or any number thereof with said shaft in a suitable transmission ratio, a differential connection between the wage registers and the cost registers, an equilibrium register controlled by said connection for indicating the relation between the amount of actuation of the wage registers and the amount of actuation of the cost registers, a second set of cost registers associated with the driving shaft, a summation register for indicating the total of the actuations of said second set of cost registers, a gear connection between each individual register and the shaft, a clutch for separately controlling each gear connection, a second shaft associated with said driving shaft, a plurality of disks mounted on said second shaft and provided each with a cam surface operatively connected with a clutch, a separable connection between said equilibrium register and said second shaft whereby the actuation of the equilibrium register causes a corresponding rotation of said second shaft to properly adjust the rate of actuation of said last mentioned summation register, and means for severing said connection to interrupt the automatic regulation of the cam shaft.

22. In combination, a plurality of individual registers of one class, a plurality of individual registers of another class, means for actuating any of such registers with substantial continuity for any desired periods of time, and means for indicating any excessive actuation in one class of registers over that in the other class of registers.

23. In combination, a plurality of wage registers, a plurality of cost registers, means for actuating any of said registers with substantial continuity for any desired periods of time, and means for measuring any excessive actuation in one class of registers over that in the other class of registers.

24. In combination, a plurality of individual registers of one class, a plurality of individual registers of another class a common continuously-operating actuating mechanism, and means for operatively connecting registers of one class with the common actuating mechanism and counterbalancingly connecting registers of the other class concurrently with said common actuating mechanism.

25. In combination, a plurality of wage registers, a plurality of individual cost registers, a common continuously-operating actuating mechanism, means for operatively connecting registers of one class with the common actuating mechanism and counterbalancingly connecting registers of the other class concurrently with the common actuating mechanism, and means for displaying a signal upon the unbalanced actuation of registers of the two classes.

26. In combination, a continuously-operating actuating mechanism, a plurality of registers, and means for connecting said registers counterbalancingly in pairs with said actuating mechanism.

27. In combination, a continuously-operating actuating mechanism, a plurality of registers, means for connecting said registers counterbalancingly with said actuating mechanism, and means for indicating the uncounterbalanced actuation of any of said registers.

28. In an accounting machine, the combination of a plurality of wage registers, a common actuating mechanism, means for connecting the various wage registers in different ratios of transmission with the actuating mechanism, a plurality of cost registers, and means for connecting the cost registers with the actuating mechanism in various ratios of transmission to correspond with the sum of the rates of actuation of a greater or less number of the wage registers.

29. In an accounting machine, the combination of a plurality of individual registers of one class, a common actuating mechanism, means for connecting the various registers of said class in different ratios of transmission with the actuating mechanism, a register of another class, means for connecting the register of the second class with the actuating mechanism in various ratios of transmission to correspond with the sum of the rates of actuation of a greater or less number of the registers of the first class, and means for indicating the ratio of transmission to the register of the second class.

30. In an accounting machine, the combination of a plurality of wage registers, a common actuating mechanism, means for connecting the various wage registers in different ratios of transmission with the actuating mechanism, a cost register, and means for automatically connecting the cost register with the actuating mechanism in a ratio of transmission to correspond with the sum of the rates of actuation of the connected wage registers.

31. In combination, a common actuating mechanism, a register, differential gearing whose common gear is connected with said register and whose driving gears are adapted for connection in various ratios of transmission with said actuating mechanism, a plurality of cams for controlling the operative connection of said driving gears with the actuating mechanism, a unitary controller for governing the position of all of said cams, and an indicator connected with said unitary controller to indicate the rate of actuation of the register.

32. In an accounting mechanism, the combination of a common driving shaft, a plurality of individual wage registers associated therewith, means for operatively connecting any one of said wage registers or any number thereof with said shaft in a suitable transmission ratio or ratios, a plurality of individual cost registers associated with said shaft, means for operatively connecting any one of said cost registers or any number thereof with said shaft in a suitable transmission ratio or ratios, and means for indicating the total excess of the actuations of one class of registers over the actuations of the other class of registers.

33. In an accounting mechanism, the combination of a common actuating mechanism, a plurality of individual wage registers associated therewith, means for operatively connecting any one of said wage registers or any number thereof with said actuating mechanism in a suitable transmission ratio or ratios, a plurality of individual cost registers associated with said actuating mechanism, means for operatively connecting any one of said cost registers or any number thereof with said actuating mechanism in a suitable transmission ratio or ratios, means for indicating the total excess of the actuations of one class of registers over the actuations of the other class of registers, an alarm signal, and means for operating the alarm signal during the unbalanced actuation of the wage and cost registers.

34. In an accounting mechanism, the combination of a time controlled driving shaft, a power shaft arranged to be geared thereto, a plurality of wage registers associated with said driving shaft, gearing for operatively connecting any one of said wage registers or any number thereof with the driving shaft in a suitable gear ratio, an adjustable gear connection between the driving shaft and the power shaft for changing the rate of actuation of the registers, and means adapted to register the total actuations of the said wage registers.

35. In an apparatus of the character described, a time controlled power mechanism, individual wage computing mechanisms operable with said power mechanism, means for resetting said computing mechanism after it has been operated, and a pay roll mechanism arranged to be operated by said resetting means; said computing mechanisms being provided with transmission shafts operated directly by said power mechanism, and means carried by said transmission shafts arranged to transmit motion therefrom during the operation of the apparatus but adapted to remain inactive for forward driving action during the resetting of the apparatus.

36. In an apparatus of the character described, a time controlled power mechanism, and a series of wage computing mechanisms coöperable with said power mechanism; said time controlled mechanism including variable speed driving members whereby the speed at which the computing mechanisms are operated may be varied to compute wages at different rates for specified periods.

37. In combination, time recording mechanism including a shaft whose rotation controls the amount of time recorded, and means for increasing the rate of rotation of said shaft to take account of overtime work.

38. In an apparatus of the character described, a time controlled power mechanism, individual wage computing mechanisms coöperable with said power mechanism, means for resetting said computing mechanism after it has been operated, and a pay roll mechanism arranged to be operated by said resetting means.

39. In an accounting system, actuating means for a waste-wage register, actuating means for a job-register, and means for automatically stopping the actuating means of said waste-wage register on starting the actuating means of said job-register and vice versa.

40. In an apparatus of the character described, a time controlled power mechanism, individual wage computing mechanisms coöperable with said power mechanism, means for resetting said computing mechanism after it has been operated, and a pay roll mechanism arranged to be operated by said resetting means.

41. In an accounting system, the combination of a plurality of workman's wage registers, and means for indicating the total of the nonproductive wages represented by such registers.

42. In an accounting system, the combination of a plurality of workman's wage registers, and means for automatically indicating the total of the nonproductive wages represented by such registers.

43. In an accounting system, a register for indicating the total cost of a job regardless of the number of workmen or rates of wages involved, and means for changing the amount of operation of the register to correspond with changes in the total wages chargeable to the job.

44. In a device of the class described, the combination of actuating means for a waste-wage register, actuating means for a job-register, and means for automatically stopping the actuating means for said waste-wage register during the operation of the actuating means for said job-register.

45. In a device of the class described, the combination of a source of power, actuating means for a waste-wage register, actuating means for a job-register, means for connecting the actuating means for said waste-wage register to said source of power, means for connecting the actuating mechanism of said job-register to said source of power, and means for automatically disconnecting the actuating means for said waste-wage register from said source of power only during the connection of the actuating means for the job-register to said source of power.

46. In a device of the class described, the combination of actuating means for a wage-register, actuating means for a waste-wage register, actuating means for a job-register, and means for automatically stopping the actuating means for said waste-wage register during the operation of the actuating means for said job-register.

47. In an accounting system, the combination of a time-controlled driving element, a plurality of registering mechanisms each comprising numeral wheels and carry-over mechanisms for actuation by said element, and mechanism for totalizing the actuations of said registering mechanisms.

48. In an accounting system, the combination of a time-controlled driving element, a plurality of registering mechanisms for indicating labor-cost and each comprising numeral wheels and carry-over mechanism for actuation by said element, and registering mechanisms for indicating the totals of the actuation of the first-named registering mechanisms in different classes of labor.

49. In an accounting system, the combination of a time-controlled driving element, a plurality of registering mechanisms for indicating labor-cost and each comprising numeral wheels and carry-over mechanism for actuation by said element, registering mechanisms for productive and non-productive labor, and a total register for indicating the total labor-cost.

50. In an accounting system, the combination of a time-controlled driving element, a plurality of registering mechanisms each comprising numeral wheels and carry-over mechanisms for actuation by said element, and a resetting means for said registering mechanisms.

51. In an accounting system, the combination of a time-controlled driving element, a plurality of registering mechanisms each comprising numeral wheels and carry-over mechanisms for actuation by said element, and mechanisms for resetting said registering mechanism by moving it forward to its initial condition.

52. In an accounting system, the combination of a time-controlled driving element, a plurality of registering mechanisms each comprising numeral wheels and carry-over mechanisms for actuation by said element, a resetting means for said registering mechanisms and total registers for indicating the cost of labor in different classes.

53. In an accounting system, the combination of a time-controlled driving element, a plurality of registering mechanisms each comprising numeral wheels and carry-over mechanisms for actuation by said element, mechanisms for resetting said registering mechanism by moving it forward to its initial condition, and registers for indicating the cost of productive and non-productive labor.

54. In an accounting system, the combination of a source of power, a wage-register, a job register, a waste-wage register, connections between said source of power and said registers for actuating said registers, and means for compelling the actuation of said wage-register concurrently with either one but not both of the other registers.

55. In an accounting system, the combination of a job-cost register, a waste-wage register, an actuating means adapted to control the actuations of the job-register or the waste-wage register at a predetermined rate, means for rendering effective the connection of the job-cost register with the actuating means, and means for automatically rendering effective the connection of the waste-wage with the actuating means when the connection of the job-cost register to the actuating means is rendered ineffective.

56. In a device of the class described, the combination of a job-cost register, a waste-wage register, an actuating means adapted to control the actuations of the job register or the waste-wage register at a predetermined rate, means rendering effective the connection of the job-cost register to the actuating means, and means for automatically rendering effective the connection of the waste-wage register with the actuating means when the connection of the job-cost register with the actuating means is rendered ineffective and for rendering ineffective the connection of the waste-wage register with the actuating means when the connection of the job-cost register with the actuating means is rendered effective.

57. In an accounting system, the combination of a job-cost register, means for actuating the job-cost register, means for rendering effective the connection of the job-cost register with the actuating means, a waste-wage register normally connected with the actuating means, and means for automatically rendering ineffective the connection between the waste-wage register and the actuating means when the connection of the job-cost register with said actuating means is rendered effective.

In witness whereof, I hereunto subscribe my name this twenty-fourth day of March, A. D. 1908.

CHARLES H. TALLMADGE.

Witnesses:
WILLIAM J. CRUMPTON,
LYNN A. WILLIAMS.